March 10, 1931.  G. H. MARSTON  1,795,727
AUTOMOBILE RUBBER CUSHIONED BUFFER FRONT
Filed Aug. 14, 1929  2 Sheets-Sheet 1

Inventor:
George H. Marston

March 10, 1931.   G. H. MARSTON   1,795,727
AUTOMOBILE RUBBER CUSHIONED BUFFER FRONT
Filed Aug. 14, 1929   2 Sheets-Sheet 2
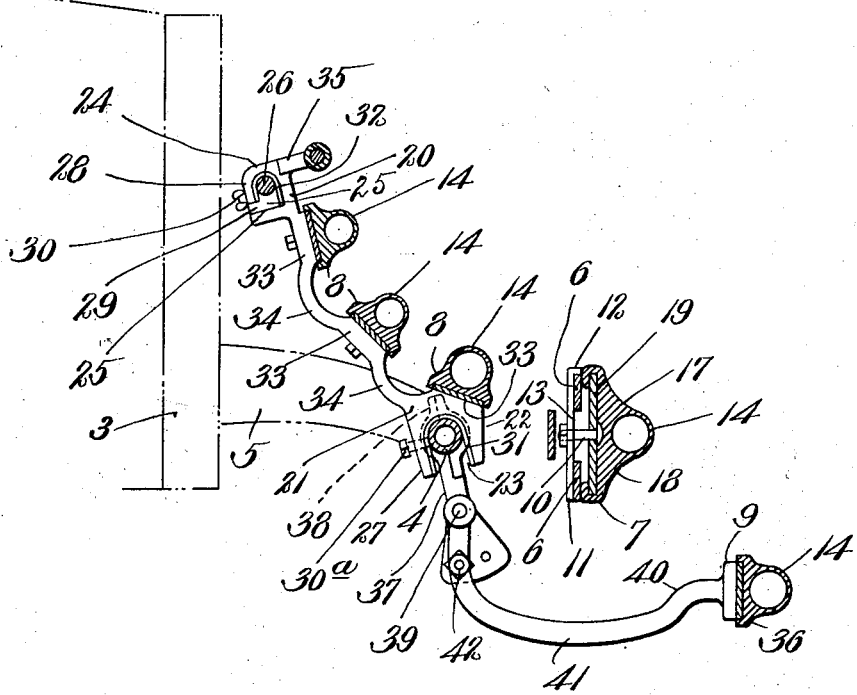
Inventor:
George H. Marston
by Franklin S. Ricker Atty.

Patented Mar. 10, 1931

1,795,727

UNITED STATES PATENT OFFICE

GEORGE H. MARSTON, OF CAMBRIDGE, MASSACHUSETTS

AUTOMOBILE RUBBER-CUSHIONED BUFFER FRONT

Application filed August 14, 1929. Serial No. 385,823.

This invention relates to improvements in automobile rubber cushioned buffer fronts, particularly to buffer fronts having pneumatic means mounted on the front of a car for protecting from injury a person that may be struck by the car.

One of the objects of the invention is to provide a device adapted to be readily attached to the front of a car, which will not only improve the appearance of the front of the car, but will prevent or greatly lessen injury to a person struck by the car, by providing pneumatic tubular means so mounted and disposed on fender members as to present a cushioned front on substantially the entire front of the car, while the fender members form a safety seat adapted to catch a person struck by the car, the pneumatic tubular means being especially adapted to greatly reduce and absorb the force of the impact in such an event.

Another object is to imbed and cushion each penumatic tube of a fender member in a rubber cushion, the whole constituting a completely cushioned fender member, whereby no metal parts will be exposed and the fender member rendered resilient from whatever angle it may be struck.

Another object is to provide a fender frame on which auxiliary fender members are mounted, having means for readily attaching the fender frame to the car, as well as detaching it, and provided also with cushioning portions adapted to serve as additional cushioning means for the frame.

Another object is to provide a tripper member in advance of the main fender member, adapted to strike a person collided with so as to cause him to fall rearwardly against the pneumatic and cushioned fender members and thus minimize or prevent injury to him.

Another object is to provide as additional safety means a rubber covered rod at the top of the fender frame for a person struck to catch hold of and so positioned as to be within ready reach.

In order that the nature of my invention may be readily understood I have illustrated certain embodiments of the invention in the accompanying drawings, in which,—

Figure 2 is a side elevation, partly in section, of the device as shown in Fig. 1.

Figure 3 is an isometric view of a complete fender member with a pneumatic tube imbedded in a rubber cushion applied thereto.

Figure 1:
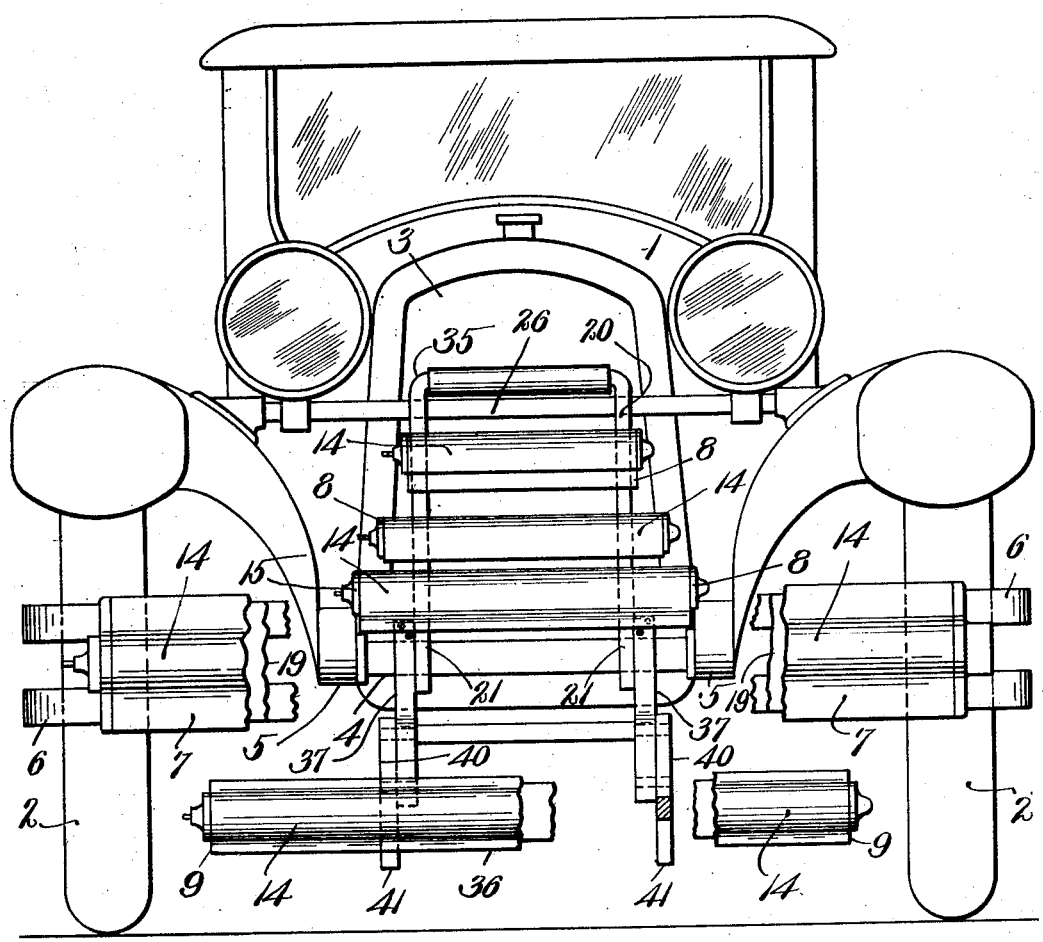
Figure 1 is a front elevation of an automobile showing a perferred form of my improved automobile rubber cushioned buffer front attached thereto.
Figure 4:
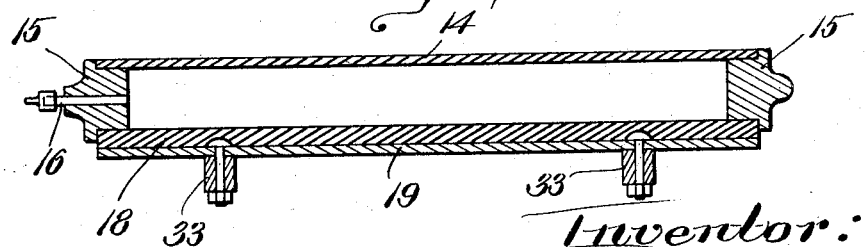
Figure 4 is a longitudinal section on the line 4—4 of Fig. 3.

In the drawings 1 designates the front end of an automobile of the usual construction, 2 the front wheels, 3 the radiator and 4 the cross bar, as used on most automobiles, located between the forward ends of the chassis springs 5. Extending longitudinally and in advance of the car is mounted the usual bumper 6, which is supported from the chassis of the car by suitable bars. Mounted on the bumper 6 and extending upwardly in front of the radiator 3 is positioned a plurality of longitudinally extending fender members, comprising a main fender member 7, attached to the bumper 6, and auxiliary fender members 8, while below is located a tripper member 9, the whole constituting a buffer front on the car. The main fender member 7 is attached to the bumper 6 by suitable bolts 10 inserted in the main fender member 7 and co-operating with L-shaped clamping plates 11 on the back of the bumper 6, the arm 12 of the clamping plates 11 resting on the upper bar of the bumper 6 and its body portion 13 engaging the inner sides of the bumper bars, thus holding the main fender member 7 in proper position on the bumper 6. If the bumper of the car is tubular in shape, it is obvious that the shape of the clamping plates 11 may be changed accordingly to fit the bumper, and if no bumper is on the car the main fender member 7 may be readily attached to the car and thus serve as a bumper as well as a fender member.

The main fender member 7, the auxiliary fender members 8 and the tripper member 9 each consists of a pneumatic rubber tube 14, provided with end pieces 15, preferably made integral with the pneumatic tube and sufficiently thick to retain the ends of the tube in shape when inflated, while through one of the end pieces 15 an air tube 16 having an air valve extends to the inside of the tube. The pneumatic tube 14 is imbedded in the crest 17 of a rubber cushion 18 tapered toward its edges and secured to a metal base plate 19, in which the bolts 10 are inserted for attaching to the bumper 6. The rubber cushion 18 extends over and entirely covers the base plate 19 including its edges, thereby providing a fully cushioned fender member in each case, having no metal parts exposed and the entire fender member being thereby cushioned and rendered resilient from whatever angle it may be struck. By imbedding the pneumatic tube 14 in the crest 17 of the rubber cushion 18 not only is additional cushioning provided for the pneumatic tube 14, but the crest 17 of the rubber cushion will yield, follow and support the pneumatic tube 14 in whatever direction the tube may be pressed, an important feature of the invention, and thus materially reduce the force of impact in case of collision. The air pressure in the pneumatic tubes 14 should be sufficient to render them properly resilient, yet not hard enough to cause a rebound upon impact.

The auxiliary members 8 are mounted on a fender frame 20, which is made of resilient metal, preferably steel, and is attached to the cross bar 4, as shown in Figs. 1 and 2, or the chassis springs 5 if the car is not provided with a cross bar, the auxiliary fender members 8 being so positioned as not to interfere with the cooling of the radiator or cranking of the car. The lower end of each of the arms 21 of the fender frame 20 is provided with an end portion 22 having a U-shaped opening 23 therein, while the upper end is also provided with a similar end portion 24 and U-shaped opening 25, the edges of the openings 23 and 25 being adapted respectively to engage and substantially surround the cross bar 4 below and the supporting bar 26 above, which extends between the lamps, whereby the fender frame 20 may be readily attached to the car by simply passing the openings 23 and 25 over the bars 4 and 26 and then pushing the fender frame 20 down so that the bars 4 and 26 will enter the upper ends of the respective openings 23 and 25, the extended portions 27 and 28 serving to hold the end portions 22 and 24 securely in position on the bars 4 and 26. In order to lock the fender frame 20 in position an inset plate 29, made to fit the lower part of the opening 25 and the under side of the bar 26, is inserted sidewise in the opening 25 and fastened therein by a thumb screw 30 extending through the extended portion 28 and engaging a threaded opening in the inner end of the inset plate 29, or the thumb screw 30 alone may be used thus locking the fender frame 20 securely in position on the bars 4 and 26.

The edges of the upper parts of the openings 23 and 25 may be provided with rubber coverings 31 and 32 so as to prevent rattling of the cooperating parts. When desired the fender frame 20 may be readily detached from the car by simply removing the inset plate 29 and releasing the openings 23 and 25 from engagement with the bars 4 and 26.

The fender frame 20 is curved rearwardly toward the radiator 3 so as to form with the auxiliary fender members 8 in conjunction with the main fender member 7, a seat for catching and holding a person struck by the car. The auxiliary fender members 8 are secured to the fender frame 20 at opposed flat portions 33, between which are downwardly extending concaved portions 34 adapted to serve as additional cushioning means for the auxiliary fender members 8 and to support the fender frame 20 and prevent it from bending or breaking by being forced against the radiator 3 in case of collision. Thus the pneumatic, cushioned auxiliary fender members 8 and main fender member 7 in conjunction with the concaved portions 34 provide complete and effective cushioning means for protecting from injury a person struck by the car. At the upper end of the fender frame 20 is located an outwardly curved rod 35, which is cushioned with a rubber cover and is so positioned as to be within ready reach of a person struck by the car and thus to enable him to hold himself on the car until it can be stopped.

Attached preferably to the cross bar 4 or the forward ends of the chassis springs 5 is the tripper member 9, which extends below and in advance of the main fender member 7 and is provided with a pneumatic, cushioned fender member 36, adapted to strike a person collided with so as to cause him to fall rearwardly against the pneumatic, cushioned fender members and the seat formed thereby and thus minimize or prevent injury to him, instead of throwing him forward against the pavement as bumpers in general use are apt to do. The tripper member 9 is provided with fixed arms 37 attached to the cross bar 4 by U-clamps 38 or other suitable means and having connected thereto by pivots 39 at their free ends movable arms 40, which are connected at their outer ends to the base plate of the fender member 36, each movable arm 40 being provided with a downwardly extending loop portion 41. The movable arms 40 are adapted to be moved by the operator on the pivots 39 from their lowered or operative position, as shown in Fig. 2, to their raised or inoperative position in front of the main fender member 7, when the car is going over rough roads, the fender member 36 being then positioned in front of the main fender member 7 and the loop portions 41 passing around the main fender member 7 as they are raised and permitting the tripper member 9 to be readily raised to its inoperative position from its operative position, while if so desired, it is obvious that lever actuated means may readily be provided to effect the operation of the tripper member 9 from the seat of the car. In order to hold the arms 40 stationary in both their operative and inoperative positions each pivot 39 is provided with suitable catch means 42 co-operating therewith and attached to the fixed arm 37.

It is evident, therefore, that the buffer front when attached to a car provides superior and practical cushioning means that will greatly reduce and absorb the force of impact in case of collision with a person, while the main fender member together with the auxiliary fender members by reason of their particular arrangement in forming a seat serve to catch and hold him in a sitting position, thus aiding greatly in protecting him from injury. Moreover, an important advantage is the buffer front is so designed that it may be readily attached to automobiles of usual construction without making any alterations in the car, while the buffer front adorns the car as well as it provides protection from injury and if so desired, the various pneumatic tubes and fender members may be painted or colored to match or harmonize with the finish of the car. It is, further, obvious that various modifications of the device may be made without departing from the scope of the invention.

I claim:—

1. An automobile buffer front attached to the front of a car and comprising a series of horizontally disposed fender members, each consisting of a pneumatic rubber tube imbedded in a rubber cushion mounted on a base plate, the said rubber cushion extending over and entirely covering the top and edges of the base plate.

2. An automobile buffer front attached to the front of a car and comprising a series of horizontally disposed fender members, each consisting of a pneumatic rubber tube imbedded in the crest of a rubber cushion mounted on a base plate and tapered toward its edges, whereby the crest of the rubber cushion will yield, follow and support the pneumatic tube in whatever direction it may be pressed.

3. An automobile buffer front attached to the front of a car and comprising a series of horizontally disposed fender members, each fender member being provided with a pneumatic rubber tube imbedded in a rubber cushion and having end pieces sufficiently thick to retain the ends of the tube in shape when inflated, one of the said end pieces being provided with an air inlet tube and valve.

4. An automobile buffer front attached to the front of a car and provided with a series of horizontally disposed fender members comprising a main fender member secured to the bumper of the car, auxiliary fender members mounted on a fender frame located above and extending back from the main fender member, and a tripper member carrying a fender member and extending below and in advance of the main fender member, each of the said fender members being provided with a longitudinally extending pneumatic rubber tube imbedded in a rubber cushion.

5. An automobile buffer front attached to the front of a car and comprising a series of horizontally disposed pneumatic, rubber cushioned fender members, including a main fender member provided with a base plate adapted to be secured to the bumper of the car by bolts inserted in the said base plate and secured to L-shaped clamping plates mounted on the back of the bumper with their arms resting on the top of the bumper, thereby securely holding the main fender member in position on the said bumper.

6. An automobile buffer front attached to the front of a car and comprising a series of horizontally disposed pneumatic, rubber cushioned fender members, including auxiliary fender members mounted on a fender frame, the upper and lower ends of each arm thereof being provided with an end portion having a U-shaped opening therein adapted to engage and thereby permit the end portion with its extended portion to substantially surround respectively a supporting bar at the upper end of the fender frame and a cross bar at the lower end of the said fender frame.

7. An automobile buffer front attached to the front of a car and comprising a series of horizontally disposed pneumatic, rubber cushioned fender members, including auxiliary fender members mounted on a fender frame, the upper and lower ends of each arm thereof being provided with an end portion having a U-shaped opening therein adapted to engage and thereby permit the end portion with its extended portion to substantially surround respectively a supporting bar at the upper end of the fender frame and a cross bar at the lower end of the said fender frame, the said opening in the upper end portion of each arm of the fender frame being provided with an inset plate adapted to fit the lower part of the said opening as well as the under side of the said supporting bar, while a thumb screw extending through the extended portion and engaging a threaded opening in the inset plate is adapted to lock the upper end portion and thereby the fender frame in position on the car.

8. An automobile buffer front attached to the front of a car and comprising a series of horizontally disposed pneumatic, rubber cushioned fender members, including auxiliary fender members mounted on a fender frame, the said auxiliary fender members being secured to the fender frame at opposed flat portions between which are downwardly extending concaved portions adapted to serve as cushioning means for the said auxiliary fender members and as a support to the said fender frame in case of collision.

9. An automobile buffer front attached to the front of a car and comprising a series of horizontally disposed pneumatic, rubber cushioned fender members, including auxiliary fender members mounted on a fender frame inclined rearwardly, and a main fender member located in advance of the said auxiliary fender members, all the said fender members being adapted to form a seat for catching and holding a person struck by the car.

10. An automobile buffer front attached to the front of a car and comprising a series of horizontally disposed pneumatic, rubber cushioned fender members, including auxiliary fender members mounted on a fender frame, said fender frame being provided at its upper end with an outwardly curved rod, cushioned with a rubber cover and so positioned as to be within ready reach of a person struck by the car.

11. An automobile buffer front attached to the front of a car and comprising a series of horizontally disposed pneumatic, rubber cushioned fender members, including a main fender member, and a tripper member provided with a pneumatic, rubber cushioned fender member and attached to the car, the said tripper member extending below and in advance of the said main fender member.

12. An automobile buffer front attached to the front of a car and comprising a series of horizontally disposed pneumatic, rubber cushioned fender members, including a main fender member, and a tripper member provided with a pneumatic, rubber cushioned fender member, the said tripper member being provided with spaced, downwardly extending fixed arms attached to the chassis of the car by U-clamps, each fixed arm having at its outer end a pivot, to which is connected a movable arm carrying the said tripper fender member, the said movable arm being provided with a downwardly extending loop portion.

13. An automobile buffer front attached to the front of a car and comprising a series of horizontally disposed pneumatic, rubber cushioned fender members, including a main fender member, and a tripper member provided with a pneumatic, rubber cushioned fender member, the said tripper member being provided with spaced, downwardly extending fixed arms attached to the chassis of the car by U-clamps, each fixed arm having at its outer end a pivot to which is connected a movable arm carrying the said tripper fender member, and each pivot being provided with catch means co-operating therewith and adapted to lock the said movable arms in both their lowered and raised positions.

14. An automobile buffer front attached to the front of a car and comprising a series of horizontally disposed pneumatic, rubber cushioned fender members, including auxiliary fender members mounted on a fender frame, the said upper and lower ends of each arm of the fender frame being provided with an end portion having means for attaching the said arms respectively to a supporting rod and a cross bar mounted on the car, each of the said upper end portions being provided with a thumb screw for securing the said upper end portions on the said supporting bar, and thus locking the fender frame in position on the car.

15. An automobile buffer front attached to the front of a car and comprising a series of horizontally disposed pneumatic, rubber cushioned fender members, including auxiliary fender members mounted on a fender frame, the said upper and lower ends of each arm of the fender frame being provided with an end portion having an L-shaped opening therein adapted to engage and substantially surround respectively a supporting bar at the upper end of the fender frame and a cross bar at the lower end of the said fender frame, the edges of the upper parts of the said openings being provided with rubber coverings adapted to prevent rattling of the co-operating parts.

GEORGE H. MARSTON.